United States Patent
Herrles et al.

(10) Patent No.: US 10,773,443 B2
(45) Date of Patent: Sep. 15, 2020

(54) EXTRUSION DEVICE AND METHOD FOR FILLING A GROOVE WITH A FILLING COMPOUND

(71) Applicant: Airbus Defence and Space GmbH, Taufkirchen (DE)

(72) Inventors: Christian Herrles, Riemerling (DE); Franz Xaver Hallweger, Valley (DE); Jens Fuhrmann, Haldenwang (DE); Meinhard Meyer, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 571 days.

(21) Appl. No.: 15/374,686

(22) Filed: Dec. 9, 2016

(65) Prior Publication Data

US 2017/0165892 A1  Jun. 15, 2017

(30) Foreign Application Priority Data

Dec. 10, 2015 (DE) .......................... 10 2015 224 834

(51) Int. Cl.
*B29C 48/30* (2019.01)
*B29C 48/155* (2019.01)
(Continued)

(52) U.S. Cl.
CPC ........ *B29C 48/30* (2019.02); *B05C 17/00506* (2013.01); *B29C 48/02* (2019.02); *B29C 48/155* (2019.02); *B29C 48/266* (2019.02); *B29C 48/301* (2019.02); *B29C 48/92* (2019.02); *B05C 5/0212* (2013.01); *B05C 5/0216* (2013.01); *B29C 2948/92571* (2019.02);
(Continued)

(58) Field of Classification Search
CPC ......... B29C 48/30; B29C 48/92; B29C 48/02; B29C 48/266; B29C 2948/92904; B29C 47/00; B05C 17/005; B29K 2827/18
See application file for complete search history.

(56) References Cited

U.S. PATENT DOCUMENTS 4,264,020 A *  4/1981  Loiseau ................ B05C 17/005
                                                137/614.14
4,635,827 A *  1/1987  Roedig ..................... B05C 7/00
                                                222/160
(Continued)

FOREIGN PATENT DOCUMENTS

CN    201 278 776 Y    7/2009
CN    103 097 103 A    5/2013
(Continued)

OTHER PUBLICATIONS

European Search Report for Application No. 16 202 517.5 dated Mar. 27, 2017.
(Continued)

*Primary Examiner* — Alison L Hindenlang
*Assistant Examiner* — Debjani Roy
(74) *Attorney, Agent, or Firm* — Jenkins, Wilson, Taylor & Hunt, P.A.

(57) ABSTRACT

An extrusion device and method for filling a groove with a filling compound. The extrusion device includes an extrusion head which is designed or configured to spring in and out in an extrusion direction of the extrusion device in a manner that is spring-resilient in the extrusion direction.

11 Claims, 4 Drawing Sheets (51) Int. Cl.
  *B29C 48/92* (2019.01)
  *B29C 48/02* (2019.01)
  *B29C 48/25* (2019.01)
  *B05C 17/005* (2006.01)
  *B05C 5/02* (2006.01)
  *B29L 31/30* (2006.01)

(52) U.S. Cl.
  CPC ............... *B29C 2948/92904* (2019.02); *B29K 2827/18* (2013.01); *B29L 2031/3085* (2013.01)

(56) References Cited

U.S. PATENT DOCUMENTS

| | | | |
|---|---|---|---|
| 5,010,841 A | | 4/1991 | Stewart |
| 5,507,994 A | | 4/1996 | Cornils et al. |
| 8,127,971 B1* | | 3/2012 | Chininis ............... A21C 15/005 |
| | | | 141/27 |
| 8,683,941 B2 | | 4/2014 | Delorme et al. |
| 9,028,235 B2* | | 5/2015 | Klose ............... B29C 47/0023 |
| | | | 264/209.3 |
| 9,676,134 B2 | | 6/2017 | Gross |
| 10,040,235 B2* | | 8/2018 | Bogue ............... B29C 64/106 |
| 2004/0217498 A1* | | 11/2004 | Ondrus ............... B29C 44/188 |
| | | | 264/40.1 |
| 2007/0228076 A1* | | 10/2007 | Horner ............... B05C 17/00559 |
| | | | 222/135 |
| 2013/0112782 A1 | | 5/2013 | Zhang |
| 2016/0257051 A1* | | 9/2016 | Pappas ............... B29C 48/865 |

FOREIGN PATENT DOCUMENTS

| | | |
|---|---|---|
| CN | 104 010 791 A | 8/2014 |
| DE | 28 12 144 A1 | 11/1978 |
| DE | 28 16 437 B1 | 8/1979 |
| DE | 32 17 410 A1 | 11/1983 |
| DE | 43 26 650 A1 | 2/1995 |
| EP | 0 263 889 A2 | 4/1988 |
| EP | 0 638 408 A1 | 2/1995 |
| EP | 1 584 449 A1 | 10/2005 |
| EP | 2 837 430 A2 | 2/2015 |
| GB | 713 184 A | 8/1954 |
| WO | WO 2008/141871 A1 | 11/2008 |
| WO | WO 2016/140880 A1 | 9/2016 |

OTHER PUBLICATIONS

European Office Action for Application No. 16 202 517.5 dated Jan. 18, 2018.
German Search Report for Application No. 10 2015 224 834 dated Jul. 29, 2016.
Chinese Office Action for Application No. 201611272844.7 dated Jul. 25, 2019.
Chinese Office Action for Application No. 201611272844.7 dated Dec. 12, 2019.

* cited by examiner

EXTRUSION DEVICE AND METHOD FOR FILLING A GROOVE WITH A FILLING COMPOUND

CROSS-REFERENCE TO RELATED APPLICATION

This application claims priority to German Patent Application DE 10 2015 224 834.8 filed Dec. 10, 2015, the entire disclosure of which is incorporated by reference herein.

TECHNICAL FIELD

The present disclosure relates to an extrusion device and to a method for filling a groove with a filling compound. In particular, the present disclosure deals with extruding filling compounds for filling joint transitions, joint grooves, grooves and/or similar recesses to be filled or smoothed in structures, in particular in structures of aircraft or spacecraft.

BACKGROUND

Although it can be used in various applications for filling joint transitions or grooves of a wide range of structures, the present disclosure and the problem that it addresses are described in greater detail in relation to the application of a filling compound in the field of airplane wings. In principle, however, the present disclosure is also usable for filling joint transitions, joint grooves or grooves in general vehicles, such as road vehicles, railway vehicles and/or water vehicles or the like.

Designing efficient aircraft which have as low a fuel consumption and associated pollutant emission as possible is a key challenge in modern aircraft construction. For this purpose, there is intensive research as to how improved wings can contribute to environmentally friendlier air traffic. Thus, in particular the level of flow drag of an airplane is rather crucially influenced by the specific, speed-dependent flow progression of the air over the surfaces of the airplane airfoils. The more uniformly this flow progresses, the lower the drag. A low drag in turn reduces the fuel consumption, the emission of pollutants and thus also the energy costs. One pursued approach thus involves optimising wing constructions to the effect that a uniform, in other words laminar, flow can be maintained in the long term without the occurrence of turbulences, which would lead to an increased drag again.

For this purpose, it is advantageous to design the surfaces of the airfoils and in particular the wing faces oriented in the direction of flight so as to be as smooth as possible. Even very slight bumps on the surfaces due to dirt, mounting imprecisions and/or painting imprecisions can influence a laminar flow on the wing. Approaches for laminar wings have a rigid leading wing edge which is rigidly connected to a wing box. When a leading wing edge of this type is connected to the wing box, this results in a joint transition which should be filled as evenly as possible with a filling compound so as to meet applicable requirements for maintaining a laminar flow.

Typically, joint transitions or joint grooves are manually filled with filling compound and subsequently manually smoothed. For this purpose, application of the filling compound may be preceded by masking the faces adjacent to the joint groove so as to protect these faces from being soiled by the filling compound. Precise application of the masking is typically time-consuming, but can at the same time be decisive as to the quality of the subsequent filling. Generally, it is found to be difficult to meet the strict requirements for the filling compound surface of a laminar wing by a manual filling process. In particular, in order to provide the required tolerances, it may sometimes be necessary to repeat the filling and smoothing process on a number of occasions in succession.

SUMMARY

It is one of the ideas of the present disclosure is to find simple solutions for filling in filling compounds which make it possible to fill grooves quickly and at the same time precisely.

Accordingly, an extrusion device for filling a groove with a filling compound is provided. The extrusion device comprises an extrusion head which is designed or configured to spring in and out in an extrusion direction of the extrusion device in a manner that is spring-resilient in the extrusion direction.

Further, a method for filling a groove with a filling compound is provided. The method comprises moving an extrusion head along the groove. The method further comprises extruding the filling compound from the extrusion head into the groove. The extrusion head springs in and out in an extrusion direction in a spring-resilient manner in line with a depth profile of the groove.

Further, a use of an extrusion device and/or a method according to the disclosure herein for filling a groove in a wing structure and/or between wing structures of an aircraft or spacecraft is provided.

One idea behind the present disclosure is to provide a special resilient, in particular spring-resilient, extrusion head which ensures a smallest possible distance between an extrusion outlet, for example an extrusion nozzle, and an application surface at any given time. The distance between the nozzle outlet face and the application face is to some extent automatically kept at a suitable minimum distance as a result of the spring-resilient effect of the extrusion head. Thus, for example, a robot-guided or a manually guided device no longer has to adhere to a predefined distance between the nozzle lower face and the groove upper face, since this can be compensated automatically within a particular range or to a particular extent by the extrusion device according to the disclosure herein once at least part of the nozzle and/or extrusion device has contact with the component. The extrusion device according to the disclosure herein is accordingly used as both an automation aid and vertical compensation. The extrusion device can be both robot-guided and manual. The extrusion device according to the disclosure herein makes it possible to fill joint transitions, joint grooves and/or grooves quickly and at the same time precisely.

To achieve a good filling result, it may sometimes be important to guide an extrusion nozzle along as closely as possible to the groove surface, in the range of fractions of millimeters, for example by a robot. However, as a result of manufacturing tolerances, the surfaces along a groove have some deviations from the desired ideal shape, and therefore, in the case of conventional methods, for as close a guiding as possible, a significant complexity of regulation or programming has to be operated in order to determine, to a sufficient degree of precision, and accordingly regulate the path of the robot for guiding the nozzle. This is in addition to the inherent imprecision of the robot used, which brings about a further spread of the desired degree of precision on the scale of tenths of millimeters. The solution according to the disclosure herein circumvents these problems by the distance between the nozzle outlet face and the application face being adhered to automatically without it having to be regulated using a complex control system.

In the present disclosure, a spring-resilient extrusion head denotes a resiliently returning extrusion head, in other words an extrusion head which yields under load and, once unloaded, automatically returns to the original configuration. This property can be implemented for example by one or more springs. The corresponding spring constant or the restoring force can be configured differently depending on the specific application, in such a way that the extrusion head springs in and out correspondingly easily or less easily. In principle, however, other spring and/or damping systems obvious to a person skilled in the art may also be used here. For example, as an alternative to a mechanical spring, the extrusion head may be designed or configured to have a pneumatic and/or hydraulic suspension or damping system.

Filling compounds within the meaning of the disclosure herein also include, inter alia, glues, compensation compounds (shim compounds), coating agents, paints or filler layers or similar materials, such as filling compounds filled with metal and/or ceramics particles. Grooves within the meaning of the disclosure herein include, inter alia, joint transitions, joint grooves and/or similar recesses to be filled or smoothed.

In a development, the extrusion head may comprise two cylinder elements plugged into one another and slidable with respect to one another, between which a cylinder spring is arranged. In this development, the extrusion head is accordingly designed or configured to have a spring system, in which two cylinder elements are movable relative to one another and coupled to one another via a spring so as to yield resiliently. For example, for this purpose the cylinder spring may be placed on a sliding projection of one cylinder element, whereupon the other correspondingly complementarily formed cylinder element can also be placed on the sliding projection, in such a way that the two cylinder elements can slide with respect to one another in a damped manner.

In a development, the two cylinder elements may be hollow in order for the filling compound to be passed through. In this development, the extrusion device may be designed or configured to be particularly simple and robust by a spring system comprising two cylinder elements and a cylinder spring being, at the same time, used to some extent as a supply pipe or supply tube for passing on the filling compound.

In a development, the extrusion head may comprise a housing. A connection end of each of the two cylinder elements may protrude out of the housing. A first cylinder element of the two cylinder elements may be rigidly connected to the housing. A second cylinder element of the two cylinder elements may be slidably mounted in the housing in the manner of a piston. Here, the connection ends may for example be used to connect the extrusion head to further elements of the extrusion device. For example, one of the connection ends or both connection ends may be designed or configured to have an inner and/or outer thread. Corresponding further elements of the extrusion device may then have counter-threads formed to complement the thread, by which the further elements can be screwed together by the extrusion head.

In a development, the two cylinder elements and/or the housing may substantially contain polytetrafluoroethylene (PFTE) at least at the surface and/or be coated with polytetrafluoroethylene. "PTFE" will be used as an abbreviation for polytetrafluoroethylene in the following. In principle, the two cylinder elements and/or the housing may also predominantly or completely consist of PTFE. PTFE is particularly suitable as a surface material for these elements because PTFE makes cleaning particularly simple and efficient. If elements are soiled after or during the application of filling compound, it can easily be removed after curing. In principle, however, it will be clear to a person skilled in the art that alternatively or additionally other materials, in particular self-separating materials, may also be used which allow for cleaning in a similarly convenient and/or residue-free manner. In this development, the extrusion device is therefore simple to clean and thus in principle reusable.

In a development, the extrusion device may comprise an extrusion nozzle. The extrusion nozzle may be designed or configured to extrude the filling mass from the extrusion head. The extrusion nozzle is used as a shaping opening in order to press out liquid or flowable curable filling compounds continuously under pressure. In principle, however, it may alternatively also be provided for the extrusion device not to comprise a special extrusion nozzle, but instead for the extrusion head to be designed or configured to have a suitable outlet opening.

In a development, the extrusion nozzle may be made of a plastics material. However, the extrusion nozzle may also be made of a metal, a plastics material and/or a ceramics composite and/or a combination of these materials (for example a metal/plastics material composite). For example, the extrusion nozzle may be manufactured by a generative or additive method of manufacture, in other words a 3D-printing method. For this purpose, a fused deposition modelling (FDM) method or a corresponding known additive method may for example be used, in which an object is constructed in layers from a meltable plastics material and/or metal. Generally, in 3D-printing methods, a starting material is laid sequentially in layers on top of one another on the basis of a digitalised geometric model and cured. 3D-printing methods are currently widespread in industrial product development, in which a resource-efficient process chain is used for manufacturing individualized components in small and large batches as required.

In a development, the extrusion head may be designed or configured to have a first thread and the extrusion nozzle to have a complementarily formed first counter-thread, in such a way that the extrusion nozzle can be screwed onto the extrusion head and unscrewed from the extrusion head. In principle, other connection technologies known to a person skilled in the art are also provided here. For example, a plug-in connection between the extrusion head and the extrusion nozzle may be provided. For this purpose, the extrusion head may be designed or configured to have a first plug-in portion, a first latch portion or generally a first connection portion, and the extrusion nozzle may correspondingly be designed or configured to have a complementarily formed first counter plug-in portion, a first counter latch portion or generally a first counter connection portion.

In a development, the extrusion device may comprise a material magazine which is designed or configured to receive the filling compound. The material magazine may be connected to the extrusion head in such a way that the filling compound can be introduced from the material magazine into the extrusion head by applying pressure. In a particularly simple development, the material magazine may for example be formed as a plastics material cartridge which is filled with a filling compound or may be filled with the filling compound. Alternatively, however, the material magazine may also be designed differently; for example, the filling compound may be supplied to the extrusion head or to the extrusion device from vats via hoses. In principle, further suitable material supply systems will also be apparent to a person skilled in the art from the context (for example, supply variants known from automated painting technology).

In a development, the extrusion head may be designed or configured to have a second thread and the material magazine to have a complementarily formed second counter-thread, in such a way that the extrusion head can be screwed onto the material magazine and unscrewed from the material magazine. In principle, other connection technologies known to a person skilled in the art are also provided. For example, a plug-in connection between the extrusion head and the material magazine may be provided. For this purpose, the extrusion head may be designed or configured to have a second plug-in portion, a second latch portion or generally a second connection portion, and the material magazine may correspondingly be designed or configured to have a complementarily formed second counter plug-in portion, a second counter latch portion or generally a second counter connection portion.

In a development, the extrusion device may comprise a robot which is designed or configured to move the extrusion head along the groove and, in the process, to fill the groove with the filling compound by extruding the filling compound from the extrusion head. Correspondingly, in a development of the method, the movement of the extrusion head along the groove may be controlled by a robot. In this development, the extrusion device may thus be operated fully automatically by a correspondingly programmed robot taking on all or virtually all operating steps. Thus, it may for example merely be left to a user to fill the material magazine with filling compound when necessary or to replace the material magazine with a filled material magazine.

The above embodiments and developments may be combined with one another in any desired manner within reason. Further possible embodiments, developments and implementations of the disclosure herein also include not explicitly mentioned combinations of features of the disclosure herein described above or in the following in relation to the embodiments. In particular, a person skilled in the art will also add individual aspects to the relevant basic form of the present disclosure as improvements or additions.

BRIEF DESCRIPTION OF THE DRAWINGS

The present disclosure is described in greater detail in the following with reference to the embodiments set out in the schematic drawings, in which.

The accompanying figures are intended to provide further understanding of the embodiments of the disclosure herein. They illustrate embodiments and are used to explain principles and concepts of the disclosure herein in connection with the description. Other embodiments and many of the stated advantages can be seen from the drawings. The elements of the drawings are not necessarily to scale in relation to one other.

In the figures of the drawings, unless specified otherwise, like elements, features and components that have the same function and effect are in each case provided with like reference numerals.

DETAILED DESCRIPTION

Figure 1:
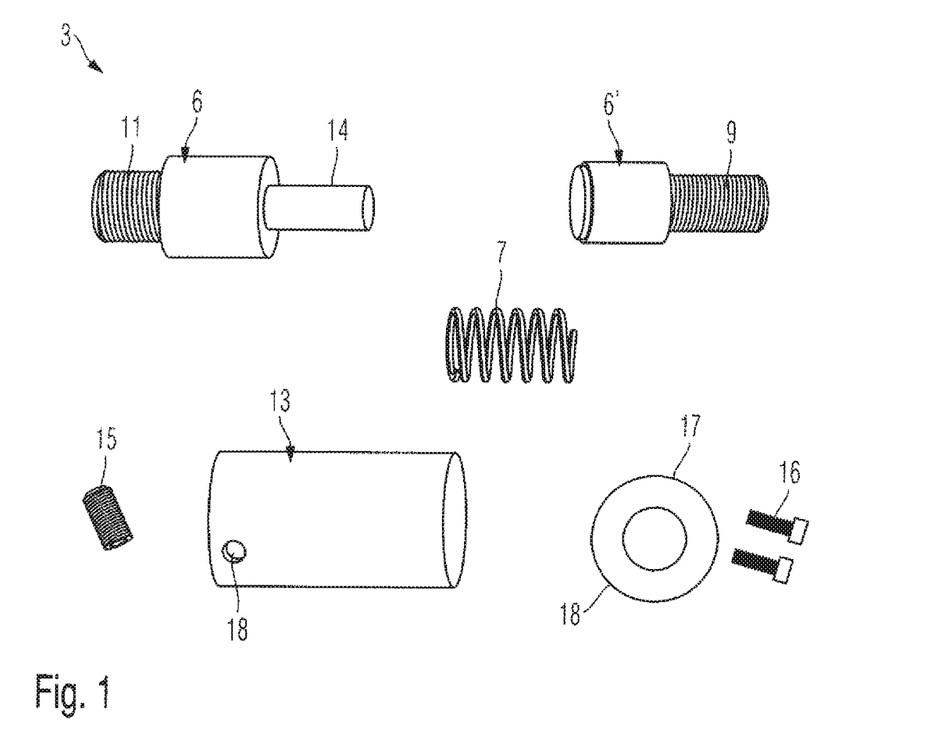
FIG. 1 is a number of schematic views of individual parts of an extrusion head of an extrusion device according to the disclosure herein for filling a groove in an aircraft or spacecraft with a filling compound in accordance with an embodiment of the disclosure herein.
Figure 2A:
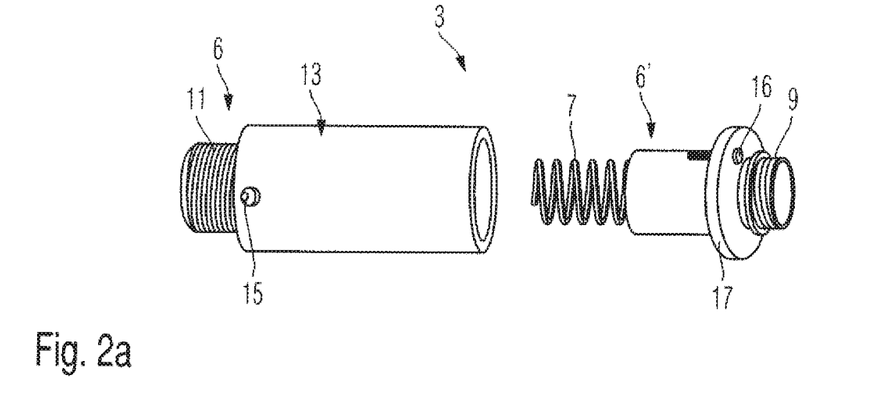
FIGS. 2a, 2b, 2c are examples of individual stages of the assembly of an extrusion device and the extrusion head from FIG. 1.
Figure 2B:
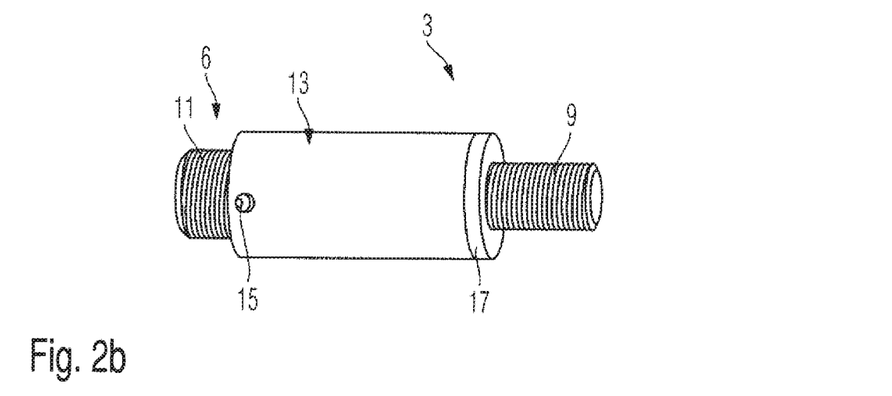
Figure 2C:
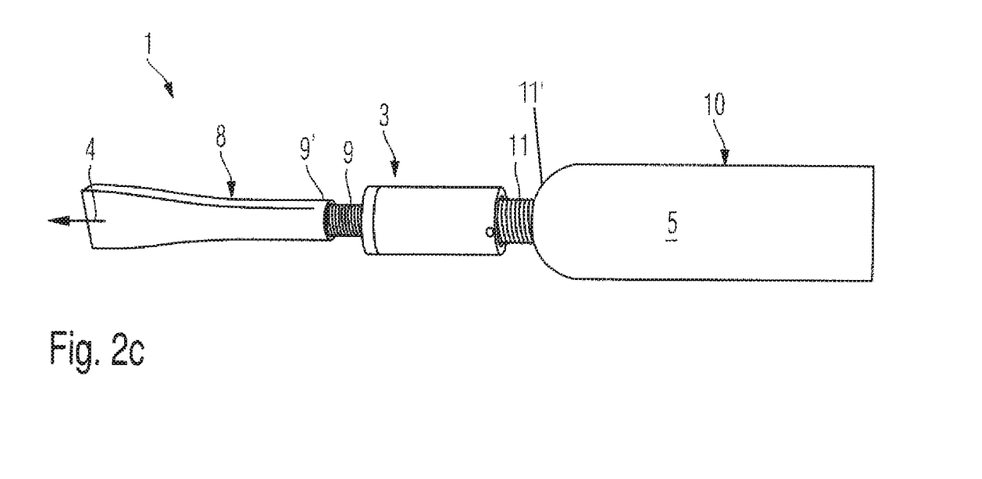

FIG. 1 is a number of schematic views of individual parts of an extrusion head of an extrusion device according to the disclosure herein for filling a groove of an aircraft or spacecraft with a filling compound in accordance with an embodiment of the disclosure herein. FIG. 2a to FIG. 2c show examples of individual stages of the assembly of an extrusion device comprising the extrusion head from FIG. 1.

In FIG. 1, reference numeral 3 denotes the extrusion head. The extrusion head 3 is shown disassembled into the individual parts thereof in FIG. 1. Basically, the extrusion head 3 comprises a first cylinder element 6, a second cylinder element 6', a cylinder spring 7 and a housing 13. To fasten these components together, in this example embodiment a set screw 15, a plurality of screws 16 and a locking disc 17 are further provided. The housing 13 comprises a screw thread 18 for receiving the set screw 15, and the locking disc 17 comprises corresponding screw threads 18 for the screws 16.

Both the two cylinder elements 6, 6' and the housing 13 are made of polytetrafluoroethylene (PTFE) in the embodiment in FIG. 1. Alternatively, however, they may also comprise or consist of PTFE merely at the surface and/or be coated with PTFE. For example, these may be plastics components which are merely coated with PTFE. The locking disc 17 may also be made of PTFE and/or a plastics material. In principle other materials which allow a filling compound 5 to be cleaned effectively and without residue are also further alternatively or additionally provided. The cylinder spring 7 and the screws 15, 16 may also comprise or consist of metal or of a metal alloy or the like.

The two cylinder elements 6, 6' are designed or configured to be hollow and in such a way that they can be plugged into one another such that they can slide with respect to one another, in other words the two cylinder elements 6, 6' together form a type of sliding joint or rotary sliding joint. In this embodiment, the first cylinder element 6 is provided with a sliding projection 14 onto which both the cylinder spring 7 and the second cylinder element 6' can be plugged. The first cylinder element 6 is further designed or configured to have a thread 11, which will be described in greater detail with reference to FIG. 2a to FIG. 2c, at one connection end. Likewise, the second cylinder element 6' is designed or configured to have a thread 9 at one connection end (see FIG. 2a to FIG. 2c).

It will be apparent to a person skilled in the art from the context that alternative embodiments which achieve the same purpose are included in the disclosure herein. For example, more than two cylinder elements may be provided. In particular, the extrusion head 3 may be constructed according to the principle of a telescopic connection or telescopic rod, comprising two or more tubes or cylinder portions that are guided in parallel into one another and can be moved out in a linear manner as far as a stop to a maximum extension length and moved back into one another again. Accordingly, more than one cylinder spring may be provided for this purpose. In principle, the disclosure herein also further comprises other spring mechanism(s) or means familiar to a person skilled in the art. For example, as an alternative to a mechanical spring, the extrusion head 3 may be designed or configured to have a pneumatic and/or hydraulic spring system, for example likewise on the basis of a plurality of cylinder elements guided in parallel within the meaning of a sliding joint or rotary sliding joint.

In the embodiment in FIG. 1, the housing 13 is also formed as a hollow cylinder which is designed in such a way that, when plugged into one another, there is room for the two cylinder elements 6, 6' in the cylinder (cf. FIG. 2a to FIG. 2c). In combination with the housing 13, the two cylinder elements 6, 6' form a type of piston system or spring system within the meaning of a sliding joint, in which the second cylinder element 6' can spring into the housing 13 and out of the housing 13 in a spring-resilient manner. The cylinder spring 7 provides a restoring force for this purpose. The precise construction of the extrusion device 1 is illustrated in the following with reference to FIG. 2a to FIG. 2c.

FIG. 2a to FIG. 2c show examples of individual stages of the assembly of an extrusion device 1 and the extrusion head 3 from FIG. 1.

FIG. 2a shows the extrusion head 3 from FIG. 1 after it has been assembled in part. On the left of FIG. 2a, the first cylinder element 6 has already been inserted into the housing 13, where it has been fastened using the set screw 15. For this purpose, the set screw 15 has been introduced into the screw thread 18 of the housing in such a way that the set screw 15 presses against the first cylinder element 6 in the interior of the housing 13, and thus fixes it in position. Further, on the right of FIG. 2a, the cylinder spring 7 has already been placed on the second cylinder element 6'. Likewise, the screws 16 have been introduced into the screw thread 18 of the locking disc 17 and placed on the second cylinder element 6' together therewith.

In FIG. 2b, the two components from FIG. 2a have been assembled and screwed together. For this purpose, the second cylinder element 6' has been introduced into the housing 13, where it has been placed on the first cylinder element 6. Subsequently, the screws of the attachment plate 17 on the housing 13 have been tightened. This results in an extrusion head 3 comprising a cylindrical housing 13, from which a connection end of each of the two cylinder elements 6, 6' protrudes. The first cylinder element 6 is rigidly connected to the housing 13, whilst the second cylinder element 6' is mounted in the housing 13 so as to be able to slide in the manner of a piston. The protruding connection ends of the two cylinder elements 6, 6' are each formed as a thread 9, 11, so as to connect the extrusion head 3 to further elements of the extrusion device 1.

In this connection, FIG. 2c shows the assembled extrusion head 3 from FIG. 2b, onto which an extrusion nozzle 8 on one side and a material magazine 10 on the other side have now been screwed. For this purpose, the extrusion nozzle 8 comprises a first counter-thread 9', which is formed so as to complement the thread 9 of the second cylinder element 6'. Correspondingly, the material magazine 10 comprises a second counter-thread 11', which is formed to complement the thread 11 of the first cylinder element 6.

The material magazine 10 is designed or configured to receive filling compound 5. Here, the material magazine 10 is connected to the extrusion head 3 in such a way that the filling compound 5 can be introduced from the material magazine 10 into the extrusion head 3 by applying pressure. As a result of pressure being applied, the filling compound 5 is introduced into the extrusion nozzle 8 through the two hollow cylinder elements 6, 6' of the extrusion head 3. The extrusion nozzle 8 in turn is designed or configured to extrude the filling compound 5 from the extrusion head 3 into an extrusion device 4, in such a way that the filling compound can be ejected into a groove 2 or the like (cf. FIG. 4). The extrusion head 3 is designed or configured to spring in and out in the extrusion direction 4 of the extrusion device 1 in a manner that is spring-resilient in the extrusion direction 4. The use of an extrusion device 1 formed in this manner will be described in greater detail with reference to FIG. 3 and FIG. 4.

Figure 3:
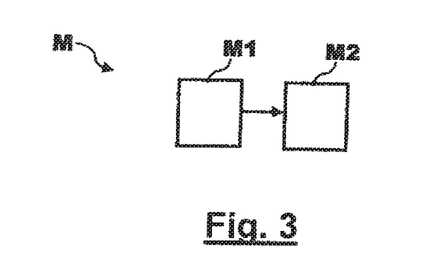
FIG. 3 is a schematic flow chart of a method according to the disclosure herein for filling a groove in an aircraft or spacecraft with a filling compound in accordance with an embodiment of the disclosure herein.

FIG. 3 is a schematic flow chart of a method M according to the disclosure herein for filling a groove 2 in an aircraft or spacecraft with a filling compound 5 in accordance with an embodiment of the disclosure herein.

In M1, the method M comprises moving an extrusion head 3 along the groove 2. The movement of the extrusion head 3 along the groove 2 may for example be controlled by a robot 12. Further, in M2, the method M comprises extruding the filling compound 5 out of the extrusion head 3 into the groove 2. The extrusion head 3 springs in or out in a spring-resilient manner in the extrusion direction 4 in line with a depth profile of the groove 2. The robot 12 is accordingly designed or configured to move the extrusion head 3 along the groove 2 and, in the process, to fill the groove 2 with the filling compound 5 by extruding the filling compound 5 from the extrusion head 3.

Figure 4:
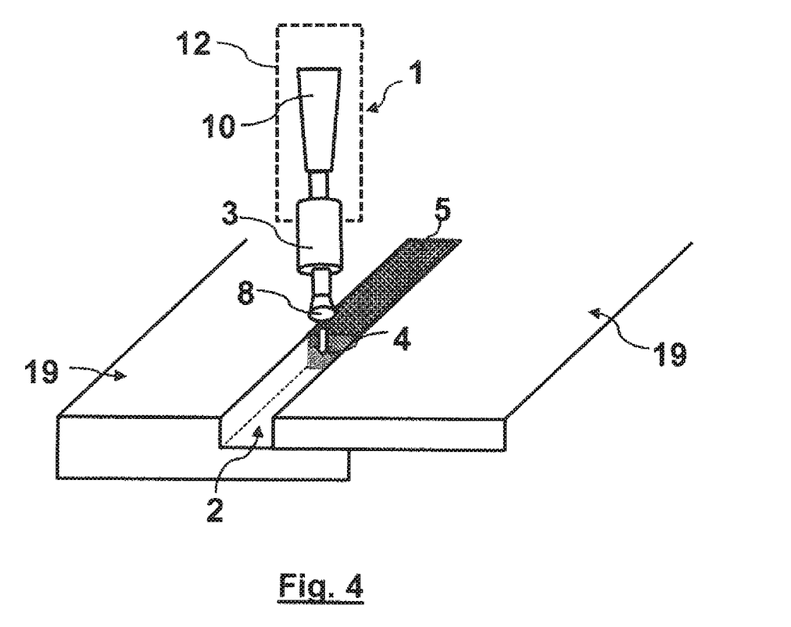
FIG. 4 is a schematic perspective view of the use of the extrusion device from FIG. 2 in the method from FIG. 3.

FIG. 4 is a schematic perspective view of the use of the extrusion device 1 from FIG. 1 in the method M from FIG. 3.

FIG. 4 shows a joint transition or groove 2 between two wing structures 19 of an aircraft or spacecraft. For example, the wing structures may be components of a laminar airplane wing, it being possible for example for a wing structure 19 to be a rigid leading wing edge which is rigidly connected to a second wing structure 19, for example a wing box. When a leading wing edge of this type is attached to the wing box, this results in a groove 2, such as is depicted schematically in FIG. 4. To meet applicable requirements for maintaining a laminar flow, a groove 2 of this type should be filled with a filling compound 5 as precisely as possible. At the same time, grooves 2 of this type should be filled rapidly and cost-efficiently in an automated manner. The use of the extrusion device 1 in the method M according to the embodiments shown in FIG. 1 to FIG. 3 now makes it possible to fill grooves 2 of this type quickly and at the same time precisely. For this purpose, the extrusion head 3, together with the extrusion nozzle 8 fastened thereto, springs in and out in a spring-resilient manner in the extrusion direction 4 in line with a depth profile of the groove 2. The distance between the extrusion nozzle 8 and the groove 2 is therefore automatically kept at a suitable minimum distance as a result of the spring-resilient action of the extrusion head 3, so long as the extrusion nozzle 8 is positioned on the groove 2. Thus, unlike in conventional methods, the robot 12 no longer has to adhere to a predefined distance between the extrusion nozzle 8 and the groove 2, since this is compensated automatically by the extrusion head 3 according to the disclosure herein.

FIG. 4 shows a perpendicular positioning of the extrusion device 1 above the groove 2 between the two wing structures 19. In principle, however, the extrusion device 1 may also equally be moved along the groove 2, in other words in a groove axis direction, at an angle of less than 90° to the plane of the wing structures 19. For example, the extrusion device 1 and in particular the extrusion head 3 may be moved along the groove at an angle of between 45° and 90° to the horizontal. In principle, it is possible, in general, to orient the extrusion device 1 at an angle of inclination that corresponds to a bevel surface.

In principle, the present disclosure is further also useable for filling joint transitions or grooves in general vehicles, such as road vehicles, railway vehicles and/or water vehicles or the like, or generally in the transport sector. Beyond the transport industry, the disclosure herein may in principle also be used in all other technical fields in which there is a need for particularly precise gluing and/or sealing.

In the above detailed description, various features have been combined in one or more examples to improve the cogency of what is described. However, it should be clear that the above description is merely illustrative and not limiting in nature by any means. It is used to cover all alternatives, modifications and equivalents of the various features and embodiments. Many other examples will be immediately and directly clear to a person skilled in the art from the above description on the basis of his expert knowledge.

The embodiments were selected and described in order to explain the principles behind the disclosure herein and the possible practical applications thereof as clearly as possible. As a result, persons skilled in the art can modify and use the disclosure herein and the various embodiments thereof in an optimal manner with respect to the intended application. In the claims and the description, the terms "containing" and "having" are used as neutral terminology for the corresponding term "comprising". Further, use of the terms "a" and "an" does not in principle exclude the possibility of a plurality of features and components described in this manner. While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An extrusion device for filling a groove with a filling compound, the extrusion device comprising:
    an extrusion head comprising a first cylinder element and a second cylinder element, the first cylinder element comprising a sliding projection that is plugged into the second cylinder element, and the second cylinder element being slidable, relative to the first cylinder element, over the sliding projection of the first cylinder element; and
    a housing, from which a respective connection end of each of the first and second cylinder elements protrudes, wherein the first cylinder element is rigidly connected to the housing and the second cylinder element is mounted in the housing and is slidable in a manner of a piston;
    wherein the extrusion head is configured to spring in and out in an extrusion direction of the extrusion device in a manner that is spring-resilient in an extrusion direction.

2. The extrusion device according to claim 1, comprising a cylinder spring arranged between the first and second cylinder elements.

3. The extrusion device according to claim 1, wherein the first and second cylinder elements are hollow to allow the filling compound to pass through the first and second cylinder elements.

4. The extrusion device according claim 1, wherein at least one of the first and second cylinder elements and the housing comprise polytetrafluoroethylene (PTFE) at least at a surface thereof or are coated with PTFE.

5. The extrusion device according to claim 1, wherein at least one of the first and second cylinder elements and a housing of the extrusion head comprise polytetrafluoroethylene (PTFE) at least at a surface thereof or are coated with PTFE.

6. The extrusion device according to claim 1, comprising an extrusion nozzle configured to extrude the filling compound from the extrusion head.

7. The extrusion device according to claim 6, wherein the extrusion nozzle comprises a plastic material.

8. The extrusion device according to claim 6, wherein the second cylinder element comprises a thread and the extrusion nozzle comprises a first counter thread that is complementarily formed to the thread of the second cylinder element, such that the extrusion nozzle can be screwed onto the extrusion head and unscrewed from the extrusion head.

9. The extrusion device according to claim 1, comprising a material magazine which is configured to receive the filling compound and is connected to the extrusion head such that the filling compound can be introduced from the material magazine into the extrusion head by applying pressure.

10. The extrusion device according to claim 9, wherein the first cylinder element comprises a thread and the material magazine comprises a second counter-thread that is complementarily formed to the thread of the first cylinder element, such that the extrusion head can be screwed onto the material magazine and unscrewed from the material magazine.

11. The extrusion device according to claim 1, comprising a robot configured to move the extrusion head along the groove and, while the extrusion head moves along the groove, to fill the groove with the filling compound by extruding the filling compound from the extrusion head.

* * * * *